April 24, 1951　　　　J. BURNHAM　　　2,549,770
ELECTRICAL CONDENSER
Filed Nov. 23, 1946
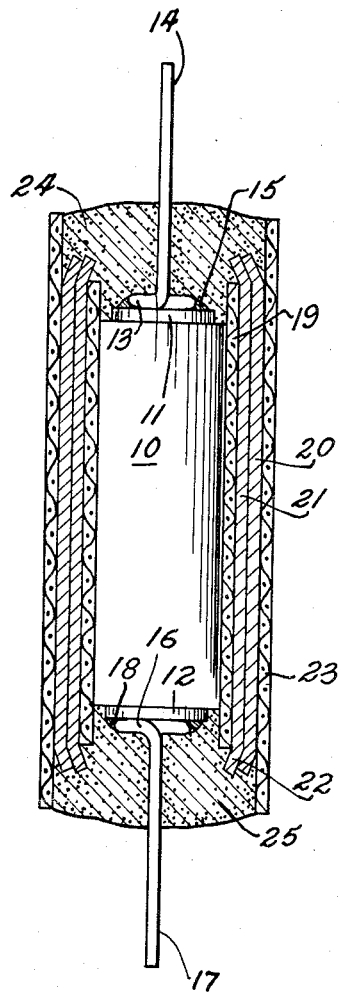
JOHN BURNHAM
INVENTOR
Arthur G. Connolly
BY
ATTORNEY Patented Apr. 24, 1951

2,549,770

UNITED STATES PATENT OFFICE 2,549,770

ELECTRICAL CONDENSER

John Burnham, Williamstown, Mass., assignor to Sprague Electric Company, North Adams, Mass., a corporation of Massachusetts Application November 23, 1946, Serial No. 711,950

3 Claims. (Cl. 175—41)

This invention relates to improved electrical condensers and more particularly refers to inexpensive moisture-resistant condensers particularly adapted for use in hearing aids.

The so-called paper tubular or wax tubular electrical condensers have been widely used for years as the most inexpensive medium-capacity condenser for general radio set use. These condensers are composed of a condenser section (made up of electrodes separated by spacers) generally of the so-called non-inductive type, with a wax or mineral oil impregnant encased in a paper tube, with a high-melting point wax filling the ends. Such a unit is generally given an over-all dip in wax to improve the resistance to moisture. While otherwise satisfactory for general use, these condensers are extremely sensitive to moisture. This affects their useful life, and also complicates their storage problem.

Where resistance to moisture is demanded, it has therefore been customary to employ the metal tubular condenser in which the condenser section is mounted in a metal tube with rubber-Bakelite end discs, about the ends of which the metal tube is spun or crimped. These metal tubular condensers are highly satisfactory even under extremely humid conditions. However, the cost of materials and labor is very greatly in excess of that involved in the manufacture of the simple paper tubular condensers and for this reason they are not employed in most radio sets.

It is an object of this invention to overcome the foregoing and other disadvantages of prior paper tubular type condensers. A further object is to produce an inexpensive moisture-resistant and durable electrical condenser. A still further object, is to produce new electrical condensers of superior moisture-resistant qualities.

These objects are attained in accordance with the present invention, which is concerned with an electrical condenser comprising a convolutely wound condenser section made up of a plurality of layers of metal foil separated by paper spacers and convolutely wound, and an insulating wrapper wound about said foil, the edges of said metal foil extending beyond the edges of said condenser section and the edges of said insulating wrapper extending beyond the edges of said metal foil, the whole assembly being completely impregnated with a wax. In a more restricted sense, this invention is concerned with an electrical condenser of the foregoing type wherein the end closures between the edges of the insulating wrapper and the condenser section are filled with a cement, the whole assembly being impregnated with a moisture-resistant wax. In a still more restricted sense, this invention is concerned with an electrical condenser of the foregoing type wherein a plurality of layers of a thin metal foil are convolutely wound about the aforesaid insulating wrapper and a secondary insulating wrapper is convolutely wound about said foil, the width of each layer wound about the condenser section being progressively increased, and the end closures of the assembly being filled with a porous cement, the whole assembly being impregnated with a moisture-resistant wax. The invention is also concerned with a process for producing electrical condensers which comprises convolutely winding electrode foils with porous paper dielectric spacing material, convolutely winding a plurality of layers of thin metal foil thereabout, convolutely winding an outer insulating wrapper thereabout, the windings being progressively greater in width, terminal wires being affixed to the electrode foils, at the ends of the condenser section, filling the end closures of the assembly and surrounding the terminal wires with a porous cement and impregnating the complete assembly with a dielectric wax.

In accordance with my invention I have found it possible to incorporate within a convolutely wound condenser assembly means for preventing passage of moisture from the outside atmosphere into the condenser section per se. I have further found that this construction, which may be made by winding one or more layers of a metal foil wider than the condenser paper and foil about the outer turns of the condenser unit itself, is advisably combined with a rigid end closure cement which is semi-porous in nature to produce a heretofore unattainable resistance to moisture in an inexpensive type condenser. The moisture barrier foil may be wound into the assembly during the winding of the condenser section on standard equipment and without undue labor requirements. This barrier foil consists of one or preferably a plurality of layers of a thin metal sheet such as aluminum or lead. While the thickness is not critical as long as the foil is flexible, I generally employ foils of thickness less than about .005″ and preferably less than .001″.

Further, in accordance with my invention I may incorporate an insulating wrapper of paper, resin film or other dielectric material about the metal barrier foil in order to insulate the latter from outside conductors. This outer or secondary insulator may consist of one or more turns of a relatively heavy material such as a .003" paper.

According to another embodiment of my invention I have found that with a semi-porous end closure cement such as that described in copending application Serial No. 576,074 filed on February 3, 1945, by Stanley O. Dorst, which is now abandoned, I may assemble the complete condenser with the ends closed by such a cement and subsequently dry the condenser and impregnate it with a liquid dielectric oil or wax thus providing not only the condenser per se but also the outer structural elements with a moisture-resistant impregnating material. I have found that this impregnation will take place, as a function of time, through the moisture barrier while at the same time it will not permit subsequent transmission of moisture. Thus, it is not necessary to employ a semi-porous end closure cement if it is desired to impregnate the condenser following complete assembly but this is generally advisable since the resistance to moisture of the end closure cement is thereby greatly enhanced.

Reference is made to the appended drawing which shows a cross-section of an electrical condenser produced in accordance with the invention. 10 represents a convolutely wound condenser section of the so-called non-inductive type, having the edges 11 and 12 of the two electrode foils extending beyond the edges of the dielectric spacer to facilitate terminal connection. The terminal wire 14 is provided with a "pigtail" 13 which is soldered to the foil edge 11 by means of solder 15. Terminal wire 17 is likewise soldered at "pigtail" 16 to foil edge 12 with solder 18. Convolutely wound about the condenser section, preferably during the winding of the latter, is an insulating wrapper 19, which protects the barrier foil 21 and 20 from contacting the electrode foils. This wrapper may consist of one or more layers of a heavy porous paper wrapper. Generally a total of about .004" is satisfactory. It is to be understood that the use of this inner wrapper is not essential, but is advisable when the arrangement of the condenser per se makes contact between the barrier foil and the electrode foil likely.

Convolutely wound about wrapper 19 and section 10 are barrier layers 20 and 21 of a thin metal foil. Preferably the metal foil consists of .00025" aluminum foil although other foils of thicknesses generally less than about .001" may be employed. While one overlapping turn is satisfactory for the purposes of the invention, it is preferable to employ a plurality of layers, wound continuously. In accordance with one of the preferred embodiments of the invention, the barrier consists of two layers of .00025" aluminum foil. The edges of the foil extend beyond the edges of wrapper 19 and section 10 since the width of the barrier is greater than that of the condenser section or the primary insulating wrapper. Because of the thinness of the foil, the edges generally turn in somewhat, as indicated at 22.

Convolutely wound about barrier layers 20 and 21 is outer wrapper 23 which may consist of a heavy gummed paper, which can also serve as a label. A suitable outer wrapper consists of two layers of a .002" kraft paper with a fish glue coating on the inner side. Since the outer wrapper is designed to electrically insulate the barrier layers from outside conductors, such as the chassis of a radio set, the thickness is selected by the conditions to be met. This wrapper may be omitted if it is not necessary to insulate the barrier layer.

Filling the two end closures is cement 24 and 25. This cement may be any one of many porous and non-porous types. While it has been found that impregnation of the condenser section may take place through the metal barrier layers by passage of the impregnant between the turns of the foil, it is generally desirable to employ a porous or semi-porous non-hydrolyzable cement if rapid impregnation of the condenser unit per se is desired after complete assembly of the wrapper, end closures, etc. Such a cement is described in co-pending application Serial No. 576,074 filed on February 3, 1945, by Stanley O. Dorst and preferably consists of 82.6% silica and 17.4% melamine-formaldehyde resin binder, by weight, applied as a paste with an aqueous dispersing agent or solvent. After drying to remove the liquid, the resulting cement is durable and hard and adheres to metal conductors as well as to cellulosic materials. In addition, it is somewhat porous in nature and may be impregnated with wax. The resistance of this cement to elevated temperatures without softening is excellent. Temperatures up to about 150° C. do not affect it adversely. Other end filling cements may be employed, however, although the use of cements such as described above represents one of the preferred embodiments of the invention, as optimum results are obtained thereby.

After assembly as described above, but before impregnation of the porous cement, the condenser may be vacuum dried and impregnated with an oil or preferably a molten wax. The condenser is thus impregnated and the metal barrier impregnated along with the end closure cement to produce a completely moisture-resistant, finished condenser in a very inexpensive operation. This avoids the necessity of impregnating the condenser section, assembling the unit and subsequently wax-dipping the assembled unit.

It has been observed that although the wax or oil will impregnate the barrier layer, moisture will not penetrate the barrier thereafter. Thus it is possible to poduce a condenser having the advantages of a metal can tubular condenser without the expense or volume required therefor.

The impregnant is preferably a wax with a melting point of 80° C. or more. Chlorinated naphthalene and micro-crystalline hydrocarbon waxes are preferred for this purpose. Viscous mineral oils may also be employed, with the usual low temperature advantages associated therewith.

As many apparently widely different embodiments of this invention may be made without departing from the spirit and scope hereof, it is to be understood that the invention is not limited to the specific embodiments hereof except as defined in the appended claims.

What I claim is:

1. A relatively compact substantially moisture-proof electrical condenser comprising a convolutely wound condenser section, at least two turns of substantially moisture-impervious metal foil wound thereabout and directly over each other to restrict the ingress of moisture to a long, thin passageway between the foil turns and an electrically insulating wrapper wound about said foil, the edges of said foil extending beyond the edges of said condenser section and the edges of said wrapper extending beyond the edges of said metal foil, a sealing cement substantially filling and sealing the extending portions of the foil and wrapper, the whole assembly including the passageway between the foil turns being completely impregnated with a wax.

2. A relatively compact substantially moisture-proof electrical condenser comprising a convolutely wound condenser section with terminal leads extending from opposite ends of said section, at least two turns of substantially moisture-impervious metal foil having a thickness of less than 0.001 inch wound about said section and directly over each other to restrict the passage of moisture to the condenser section, and an electrically insulating wrapper wound about said foil, the side edges of said foil extending beyond the ends of said section, the side edges of said wrapper extending beyond the edges of said foil and a substantially moisture-proof sealing composition substantially filling the end closures between edges of said foil and said wrapper and sealed around said leads, the whole assembly including the passageway between the foil turns being impregnated with a moisture-resistant wax.

3. A relatively compact substantially moisture-proof electrical condenser comprising a convolutely wound condenser section having a paper dielectric spacer and terminal leads extending from the ends of said condenser section, a primary electrically insulating wrapper wound about said condenser section and projecting beyond both ends of the section, at least two turns of metal foil about 0.00025 inch thick wound directly over each other about and projecting beyond the ends of said primary wrapper, a secondary electrically insulating wrapper wound about and projecting beyond the ends of said foil, the projecting portions of the wrappers and foil being substantially filled with a porous non-hydrolyzable cement which is sealed around the leads, and the whole assembly including the porous cement being impregnated with a moisture-resistant wax which renders the foil wrapping substantially moisture-proof, said cement fillings being of such dimensions that in impregnated condition they are also substantially moistureproof.

JOHN BURNHAM.

REFERENCES CITED

The following references are of record in the file of this patent:

UNITED STATES PATENTS

| Number | Name | Date |
|---|---|---|
| 679,171 | Jones | July 23, 1901 |
| 1,715,349 | Bodman | June 4, 1929 |
| 1,870,803 | Fried | Aug. 9, 1932 |
| 1,980,312 | Caine | Dec. 6, 1932 |

FOREIGN PATENTS

| Number | Country | Date |
|---|---|---|
| 502,039 | Great Britain | Mar. 9, 1939 |